US009571567B2

(12) United States Patent
Shu et al.

(10) Patent No.: US 9,571,567 B2
(45) Date of Patent: Feb. 14, 2017

(54) METHODS AND SYSTEMS TO MANAGE COMPUTER RESOURCES IN ELASTIC MULTI-TENANT CLOUD COMPUTING SYSTEMS

(71) Applicant: VMware, Inc., Palo Alto, CA (US)

(72) Inventors: Guoqiang Shu, San Jose, CA (US);
Ganesha Shanmuganathan, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 499 days.

(21) Appl. No.: 13/830,212

(22) Filed: Mar. 14, 2013

(65) Prior Publication Data
US 2014/0280956 A1   Sep. 18, 2014

(51) Int. Cl.
| *H04L 12/70* | (2013.01) |
| *H04L 29/08* | (2006.01) |
| *H04L 12/24* | (2006.01) |
| *G06F 9/50*  | (2006.01) |

(52) U.S. Cl.
CPC ......... *H04L 67/1004* (2013.01); *G06F 9/5077* (2013.01); *H04L 41/082* (2013.01); *H04L 41/0893* (2013.01); *G06F 2209/504* (2013.01); *G06F 2209/5011* (2013.01); *G06F 2209/5014* (2013.01); *H04L 41/5096* (2013.01); *Y02B 60/142* (2013.01)

(58) Field of Classification Search
CPC .................................. H04L 12/70; H04L 47/72
USPC ......................................................... 709/226
See application file for complete search history.

(56) References Cited

U.S. PATENT DOCUMENTS

| 6,366,945 | B1   | 4/2002  | Fong                            |
|-----------|------|---------|---------------------------------|
| 2004/0243650 | A1* | 12/2004 | McCrory et al. ............ 707/203 |
| 2008/0189468 | A1* | 8/2008  | Schmidt et al. ................. 711/6 |
| 2009/0183168 | A1* | 7/2009  | Uchida ........................ 718/104 |
| 2010/0125477 | A1* | 5/2010  | Mousseau ............ G06F 9/5072 717/177 |
| 2010/0332657 | A1* | 12/2010 | Elyashev et al. ............ 709/226 |
| 2011/0258323 | A1* | 10/2011 | Jackson ....................... 709/226 |
| 2012/0284408 | A1* | 11/2012 | Dutta ................... G06F 9/5066 709/226 |
| 2013/0055262 | A1* | 2/2013  | Lubsey et al. .................... 718/1 |
| 2014/0019966 | A1* | 1/2014  | Neuse .................. G06F 9/5077 718/1 |

OTHER PUBLICATIONS

"VCloud Director Administrator's Guide", VMware Inc., vCloud Director 1.5, 2010-2011, (114 pages).

(Continued)

*Primary Examiner* — Moustafa M Meky
*Assistant Examiner* — Elizabeth Kassa

(57) ABSTRACT

Methods and systems to reconfigure clusters in elastic multi-tenant cloud computing system. An example method includes partitioning a first resource reservation of a first virtual data center between a first cluster and a second cluster and partitioning a second resource reservation of a second virtual data center between the first cluster and the second cluster, and based on the partitioning of the first resource reservation and the second resource reservation, collectively adjusting a first portion of the first resource reservation allotted to the first cluster and a second portion of the second resource reservation allotted to the first cluster in a same reconfiguration operation.

12 Claims, 6 Drawing Sheets

(56) References Cited

OTHER PUBLICATIONS

"VCloud Director User's Guide", VMware Inc., vCloud Director 1.5, 2010-2011, (118 pages).
"VSphere Resource Management", VMware Inc., Update 1 ESXi 5.0 vCenter Server 5.0, 2006-2012, (110 pages).

* cited by examiner

*500

| |
|---|
| II:502 Algorithm: Computer Partition of a Group of virtual data centers |
| II:504 Input: list of virtual data centers, list of clusters |
| II:506 Output: list of resource pool specifications for each cluster |
| II:508 Obtain a list of vDC affected by deployment event |
| II:510 Shuffle the list |
| II:512 for each cluster |
| II:514   Retrieve current unreserved capacity as $Cap_i$ |
| II:516   $NewRpSpecMap_i = \{\}$ |
| II:518 for each $vDC_k$ |
| II:520   Calculate Partition For Affected Virtual Data Centers |
| II:522   Let $\{R^i_{new}, L^i_{new}, S^i_{new}\}$ be the new resource pool setting on $Cluster_i$ |
| II:524   for each $Cluster_i$ |
| II:526       $NewRpSpecMap_i[k] = \{R^i_{new}, L^i_{new}, S^i_{new}\}$ |
| II:528       $Cap_i \mathrel{+}= (R^i_{current} - R^i_{new})$ |
| II:530 Return NewRpSpecMap |

FIG. 5

METHODS AND SYSTEMS TO MANAGE COMPUTER RESOURCES IN ELASTIC MULTI-TENANT CLOUD COMPUTING SYSTEMS

FIELD OF THE DISCLOSURE

This disclosure relates generally to cloud computing systems, and more specifically, to managing computer resources in elastic multi-tenant cloud computing systems.

BACKGROUND

In cloud computing environments, virtual data centers provide processor, memory and storage resources to cloud tenants. Some cloud providers permit tenants to reserve virtual data center resources sufficient to support their current and/or anticipated computing needs. For example, tenants can opt to rent a virtual data center having a reserved amount of resources referred to as a resource pool reservation or a resource reservation. A resource reservation associated with a virtual data center may be configured to provide, for example, 1) a specified limit on the overall amount of memory ("L") that may be used by the client, and 2) a specified minimum amount of memory ("R") that is guaranteed to be available at any given time. Each virtual data center is typically supported by one or more physical clusters, referenced by their corresponding cluster resource pools, and the resource reservation of a virtual data center is partitioned (preferably in a balanced manner) among the cluster resource pools. The portion of the resource reservation allotted to each individual cluster resource pool is determined using, for example, a partitioning method and is reflected in a corresponding cluster resource pool specification map.

BRIEF DESCRIPTION OF THE DRAWINGS

FIG. 5 is pseudo code representation of example machine readable instructions which may be executed to implement an example asynchronous configuration tool of FIG. 2.

DETAILED DESCRIPTION

Figure 1:
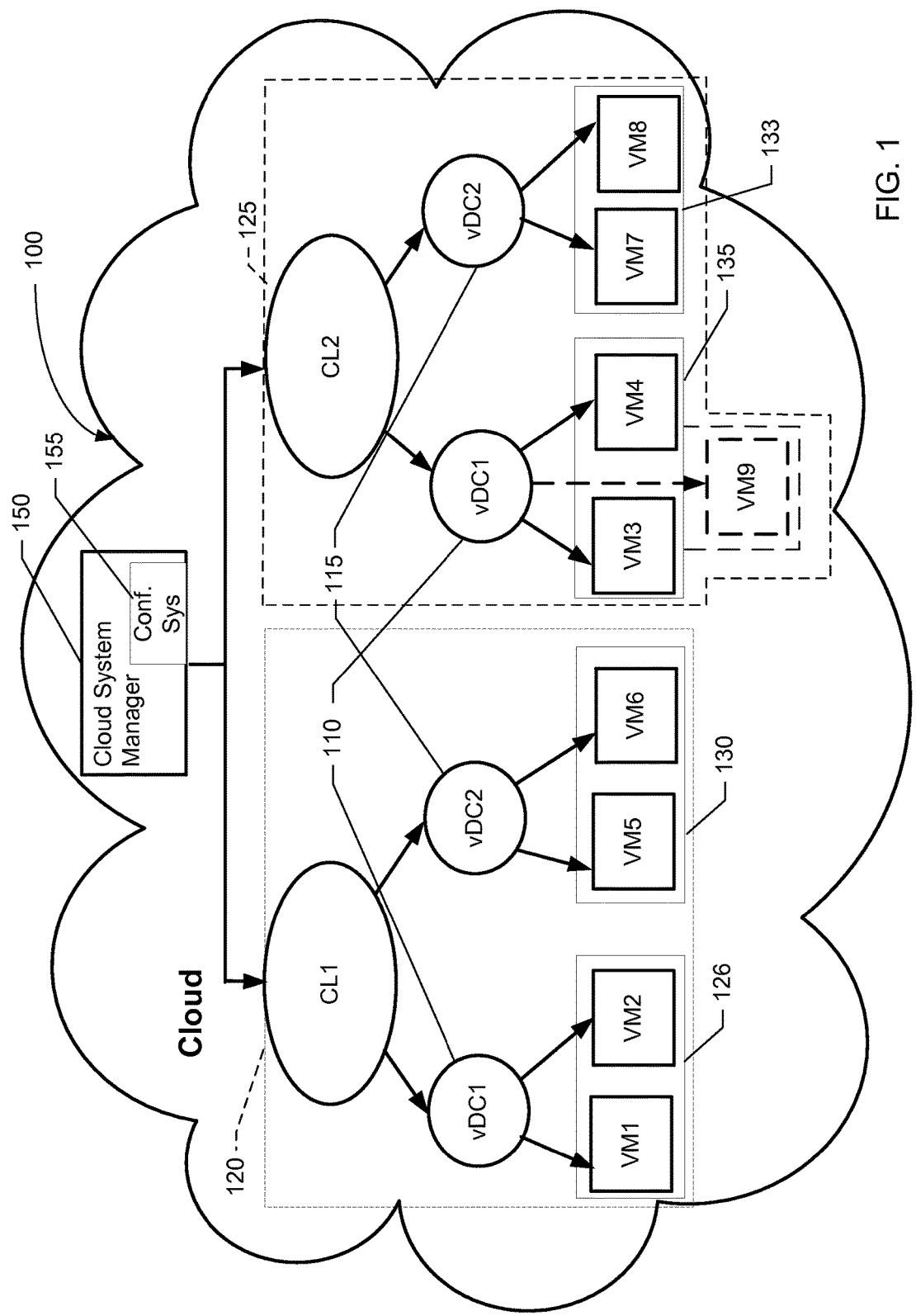
FIG. 1 is block diagram of an example cloud architecture having an example cloud system manager that includes a cluster configuration tool.

In conventional cloud computing systems, multiple computer clusters, each associated with resources to run virtual machines, may be deployed to support a single virtual data center. A need for an "elastic" virtual data center may arise when one or more virtual machines in the virtual data center have to span across multiple computer clusters. For example, in some instances a first virtual data center associated with a first tenant and a second virtual data center associated with a second tenant are deployed on a same cluster, e.g., a first cluster. If, for example, the first tenant subsequently requires an increase in the memory (or other resources) associated with the first virtual data center, but the remaining capacity of the first cluster is insufficient to support such an increase, other clusters may be assigned to provide the resources needed to support the requested resource increase of the first virtual data center. When this occurs, the first virtual data center is supported by resources associated with the first cluster and with the second cluster. In some instances, the second tenant may also request that the capacity of the second virtual data center be expanded. If the second cluster has sufficient resources to support the expanded capacity, the second cluster may also be assigned to support the second virtual data center. The ability to expand the capacity allotted to a virtual data center using resources associated with multiple clusters allows the cloud to be scalable.

Generally, cloud infrastructure system software uses a partitioning method to partition/apportion the resource reservation of a virtual data center among multiple clusters of servers associated with the virtual data center. The partitioning method adjusts resource pool reservation parameters for clusters that form cluster resource pools so that (1) each cluster resource pool's minimal reservation (R) is enough for all the virtual machines to power on and, each cluster resource pool is configured to include an amount of resources that is proportional to a number of virtual machines deployed on the cluster in support of the virtual data center being partitioned. Typically, each time a new virtual machine(s) is deployed or undeployed (generically referred to as a deployment event) in a virtual data center the system software partitions the corresponding resource reservation and then reconfigures corresponding clusters by adjusting the resources assigned to the corresponding cluster resource pools in accordance with the new resource partition/apportionment. In some cases, deployment events occur frequently such that the number of cluster reconfigurations can be significant, often causing an undesired reduction in system speed/efficiency. In some cases a single deployment event includes the deployment/undeployment of multiple virtual machines in a same operation, at a same time, or within a window of time.

Example apparatus, methods and systems disclosed herein permit reconfiguration of a cluster by collectively adjusting the resources assigned to multiple cluster resource pools of the cluster in a same reconfiguration operation. In some example methods and systems, a first resource reservation of a first virtual data center is partitioned between a first cluster and a second cluster and a second resource reservation of a second virtual data center is partitioned between the first cluster and the second cluster. Based on the partitioning of the first and second virtual data centers, a first portion of the first resource reservation allotted to the first cluster and a second portion of the second resource reservation allotted to the first cluster are collectively adjusted in a same reconfiguration operation. In some examples, the first portion and the second portion are adjusted based on a first deployment event affecting the first virtual data center and a second deployment event affecting the second virtual data center, respectively, and the reconfiguration operation is delayed relative to a first time at which the first deployment occurs and a second time at which the second deployment occurs. Some example configuration systems include a partitioner that partitions a first resource reservation of a first virtual data center between a first cluster and a second cluster and that partitions a second resource reservation of a second virtual data center between the first cluster and the second cluster. An example configuration system also includes a resource adjuster to adjust, based on the partitioning of the first and second resource reservations, a first portion of the first resource reservation allotted to the first cluster and a second portion of the second resource reservation allotted to the first cluster in a same reconfiguration operation.

FIG. 1 is a block diagram of an example cloud architecture 100 including a first virtual data center ("vDC-1") 110 and a second virtual data center ("vDC-2") 115. A first cluster resource pool 126 (including a first and second virtual machine, "VM1" and "VM2," on the first cluster "CL1" 120) and a second cluster resource pool 135 (including a third and fourth virtual machine, "VM3" and "VM4," deployed on the second cluster "CL2" 125) are configured to support a resource reservation pool associated with the first virtual data center 110. A third cluster resource pool 130 (including a fifth and a sixth virtual machine, "VM5" and "VM6," deployed on the first cluster CL1 120) and a fourth cluster resource pool 133 (including a seventh and eighth virtual machine, "VM7" and "VM8" 134 deployed on the second cluster CL2 125) are configured to support a resource reservation associated with the second virtual data center 115. An example cloud system manager 150 communicably coupled to the first and second clusters 120, 125 includes or otherwise controls a configuration system 155 that operates to reconfigure the first and second clusters 120, 125 in response to virtual machine deployment events (deployment events). A deployment event can include the deployment/undeployment of a single or multiple virtual machines on a virtual data center at (or near) a same time.

In some examples, the resource reservation of the first virtual data center 110 specifies a memory limit "L" (e.g., ten Gigabytes) and a guaranteed available minimum memory, "R," (e.g., five Gigabytes). The guaranteed available minimum memory, "R," (e.g., five GB) is partitioned among the first cluster resource pool 126 and the second cluster pool cluster 135 in proportion to the number of virtual machines associated with each of the first and second cluster resource pools 126, 135. In some such examples, because the number of machines in the first cluster resource pool 126 is equal to the number of machines in the second cluster resource pool 135, the guaranteed available minimum memory is apportioned between the first and second cluster resource pools 126, 135 equally (i.e., 2.5 GB is apportioned to VM1 and VM2 and 2.5 GB is apportioned to VM3 and VM4). The apportionment of the resource reservation associated with the first virtual data center 110 is recorded in a first cluster resource pool specification map associated with the first cluster resource pool 126 (e.g., "RpSpecMap$_{CL1}$[k]") and in a second cluster resource pool specification map associated with the second cluster resource pool 135 (e.g., "RpSpecMap$_{CL2}$[k]"). The variable "k" represents an identification number of the virtual data center (e.g., vDC1 110 and vDC2 115). In some examples, each cluster resource pool specification map specifies values for the memory limit "L," the guaranteed available minimum memory, "R," and also specifies an importance level of the virtual machines of the corresponding cluster resource pool, "S" (e.g., high, medium, low) such that "RpSpecMap$_i$[k]={R$^i$, L$^i$, S$^i$}."

In some examples, a deployment event occurs in which another virtual machine (e.g., "VM9") is subsequently deployed in the second cluster resource pool 135 causing the number of virtual machines in the second cluster resource pool 135 to be unequal to the number of virtual machines in the first cluster resource pool 126. In response to such a deployment event, the configuration system 155 partitions the resource reservation of the first virtual data center. For example, the configuration system 155 may partition/apportion three of the five GB of minimum guaranteed memory, "R," to the second cluster resource pool 135 and two GB to the first cluster resource pool 126 to maintain the desired apportionment based on the number of virtual machines in each cluster resource pool. The new apportionment is reflected in a new cluster resource pool specification map for the first cluster resource pool 126, (e.g., "NewRPSpecMap$_{CL1}$[vDC1]") and a new cluster resource pool specification map for the second cluster resource pool 135 (e.g., "NewRPSpecMap$_{CL2}$[vDC1]").

In addition to reapportioning the resource reservation of the virtual data center 110 among the first and second cluster resource pools 126 and 135, the example configuration system 155 may need to adjust the memory allotted to the second cluster resource pool 135 to enable power-on of the newly deployed virtual machine (e.g., VM9) and to promote system stability. For example, a hypervisor operating on each virtual machine requires a specific amount of memory (referred to as "overhead memory") to enable virtual machine power-on. If, after a deployment event, the amount of available memory in the cluster resource pool affected by the deployment event is insufficient to support the memory needs of each virtual machine in that cluster resource pool, the configuration system 155 adjusts the memory of that cluster resource pool, as needed. Further, to guarantee virtual machine performance, each virtual machine will preferably have access to a defined amount of physical memory (referred to as "reserved memory"). As a result, in response to a deployment event, the configuration system 155 of the illustrated example may also adjust the amount of available memory allotted to the cluster resource pool affected by the deployment event, as needed, to exceed the sum of all of the reserved memories associated with the virtual machines included in that cluster resource pool. Note that providing a cluster resource pool with more memory than the sum of the reserved memories, although preferable for virtual machine performance, is not essential to virtual machine power-on. As described above, when such additional resources are allotted to enable virtual machine power-on, the cluster resource pool specification map is further adjusted to include the additional memory resources. The resulting cluster resource pool specification maps (e.g., "newRPSpecMapCL1[vDC1]" and "newRPSpecMapCL2[vDC1]") are then used by the configuration system 155 to reconfigure the clusters (e.g., CL1 and CL2) associated with the cluster resource pools being adjusted (e.g., the first cluster resource pool 126 and the second cluster resource pool 135).

In some examples, the configuration system 155 uses a limited configuration operation and a unified reconfiguration operation to perform the cluster reconfiguration operations described above. In some such examples, in response to the deployment of a new virtual machine(s) (e.g., the deployment of the virtual machine VM9) on a cluster resource pool, the example configuration system 155 determines whether the cluster resource pool (e.g., the second cluster resource pool 135) affected by the deployment event has sufficient resources to support the power-on of the new virtual machine (e.g., whether the amount of overhead memory and/or reserved memory is sufficient to enable power-on of VM9). If the available resources are insufficient to enable power-on of the newly deployed virtual machine, the configuration system 155 performs a limited reconfiguration operation that identifies the cluster resource pools that have insufficient resources and reconfigures only those cluster resource pools to supply memory sufficient to enable power-on of the newly deployed VMs. Such an example limited reconfiguration operation does not include partitioning the virtual data center resource reservation among the corresponding cluster resource pools. When such an example limited reconfiguration operation is performed, the example configuration system 155 further reconfigures the cluster using the unified reconfiguration operation at a later time to effect a partitioning of the resource reservation of the affected data center. The limited reconfiguration operation is performed on the cluster affected by the deployment event at the time of the deployment event (e.g., synchronously with the deployment event) so that the virtual machine(s) associated with the deployment event can be powered on without delay.

In some examples, when the resources available to the cluster resource pool on which the virtual machine is newly deployed are insufficient to enable power-on of the newly deployed virtual machine (e.g., VM9 ), the example configuration system 155 may perform a full reconfiguration operation, without delay, instead of a limited reconfiguration operation. Unlike a limited reconfiguration operation, a full reconfiguration operation includes not only adjusting the cluster resource pool specifications to enable virtual machine power-on but also includes partitioning the resource reservation of the virtual data center affected by the deployment among the cluster resource pools corresponding to the affected virtual data center. Thus, when a full reconfiguration operation is performed, all clusters associated with the virtual data center are reconfigured. Each cluster that is reconfigured, whether via a limited reconfiguration operation or a full reconfiguration operation, is reconfigured by adjusting the resources allotted to a single cluster resource pool on the cluster being reconfigured. In addition, both limited and full reconfiguration operations, are responsive to a single deployment event, whether that deployment event includes the deployment of a single virtual machine on a cluster resource pool or the deployment of multiple virtual machines in a same cluster resource pool at (or near) the same time.

If sufficient resources exist to enable power-on of the newly deployed virtual machine (e.g., VM9 ), the configuration system 155 of the illustrated example delays reconfiguration of the clusters (e.g., CL1 120 and CL2 125) that support the affected virtual data center (e.g., vDC1 ) until a later time, as described below. In some such examples, the configuration system 155 collects information identifying clusters, virtual data centers, cluster resource pools, etc., affected by deployment event(s) until a threshold condition is met (e.g., a threshold amount of time has elapsed, a threshold number of deployment events have occurred, etc.). When the threshold condition is met, a trigger signal is generated. The configuration system 155 responds to the trigger signal by partitioning each of the virtual data centers affected by at least one deployment event during a time intervening between the receipt of the trigger signal and the receipt of an earlier-generated trigger signal. In some examples, the configuration system partitions each virtual data center affected by a deployment event to apportion each corresponding resource reservation among the cluster resource pools associated with a corresponding one of the affected virtual data center(s) based on the deployment events (e.g., based on the number of virtual machines deployed in each associated cluster resource during the deployment event). In some examples, multiple deployment events affecting a same virtual data center will occur within the intervening time. When this occurs, the net change in the number of virtual machines deployed on each of the corresponding cluster resource pools is used to partition the virtual data center resource reservation to account for all virtual machine deployments/undeployments occurring within the intervening time. If a number of virtual machines deployed and undeployed on a same virtual data center within the intervening time results in no net change in the number of virtual machines deployed on each of the corresponding cluster resource pools, then the configuration system 155 does not partition the virtual data center after receipt of the trigger signal (e.g., in response to the multiple deployment events). Likewise, if the proportion of virtual machines deployed on a cluster resource pool of the virtual data center relative to the virtual machines deployed on another cluster resource pool of the virtual data center does not change, the example configuration system 155 need not perform the partitioning operation.

In some examples, the partitioning operation results in the calculation of new cluster resource pool specifications for each cluster resource pool associated with an affected virtual data center. The new cluster resource pool specifications include cluster resource pool settings that have been adjusted relative to corresponding, existing cluster resource pool specifications to incorporate the results of the partitioning operation. In some examples, the partitioning operation identifies an amount by which the existing cluster resource pool specifications of each cluster resource pool associated with an affected virtual data center are to be adjusted in response to the deployment event.

The configuration system 155 then performs a unified cluster reconfiguration operation on each cluster having one or more cluster resource pools to be adjusted based on deployment event(s). In some examples, the unified cluster reconfiguration includes: 1) selecting a cluster to be reconfigured due to multiple deployment event(s) affecting multiple virtual data centers associated with the cluster, 2) identifying the new cluster resource pool specification maps calculated by the partitioner for the event-affected cluster resource pools of the selected cluster (and/or identifying the amounts by which the existing cluster resource pool specification maps are to be adjusted), 3) adjusting the resources of the event-affected cluster resource pools to reflect the corresponding new cluster resource pool specification maps calculated by the partitioner, as needed, 4) calculating a new amount of free capacity associated with the selected cluster based on the adjusted cluster resource pool specification maps, and 5) collectively supplying the new cluster resource pool specification maps of the cluster and the new amount of free capacity to a memory controller for storage in a configuration database in a same operation. Thus, unlike conventional systems which respond to each deployment event by contemporaneously reconfiguring each individual cluster (s) affected by the event, the configuration system 155 of the illustrated example: 1) contemporaneously (e.g., synchronously reconfigures individual cluster(s) affected by a deployment event, as needed to enable virtual machine power-on, and otherwise, 2) performs, in a delayed manner (e.g., asynchronously), a unified reconfiguration operation on a cluster to collectively respond to multiple deployment events affecting multiple virtual data centers of that cluster. As a result, the configuration system 155 performs a fewer number of cluster reconfigure operations than conventional configuration systems, thereby improving system speed and efficiency.

Figure 2:
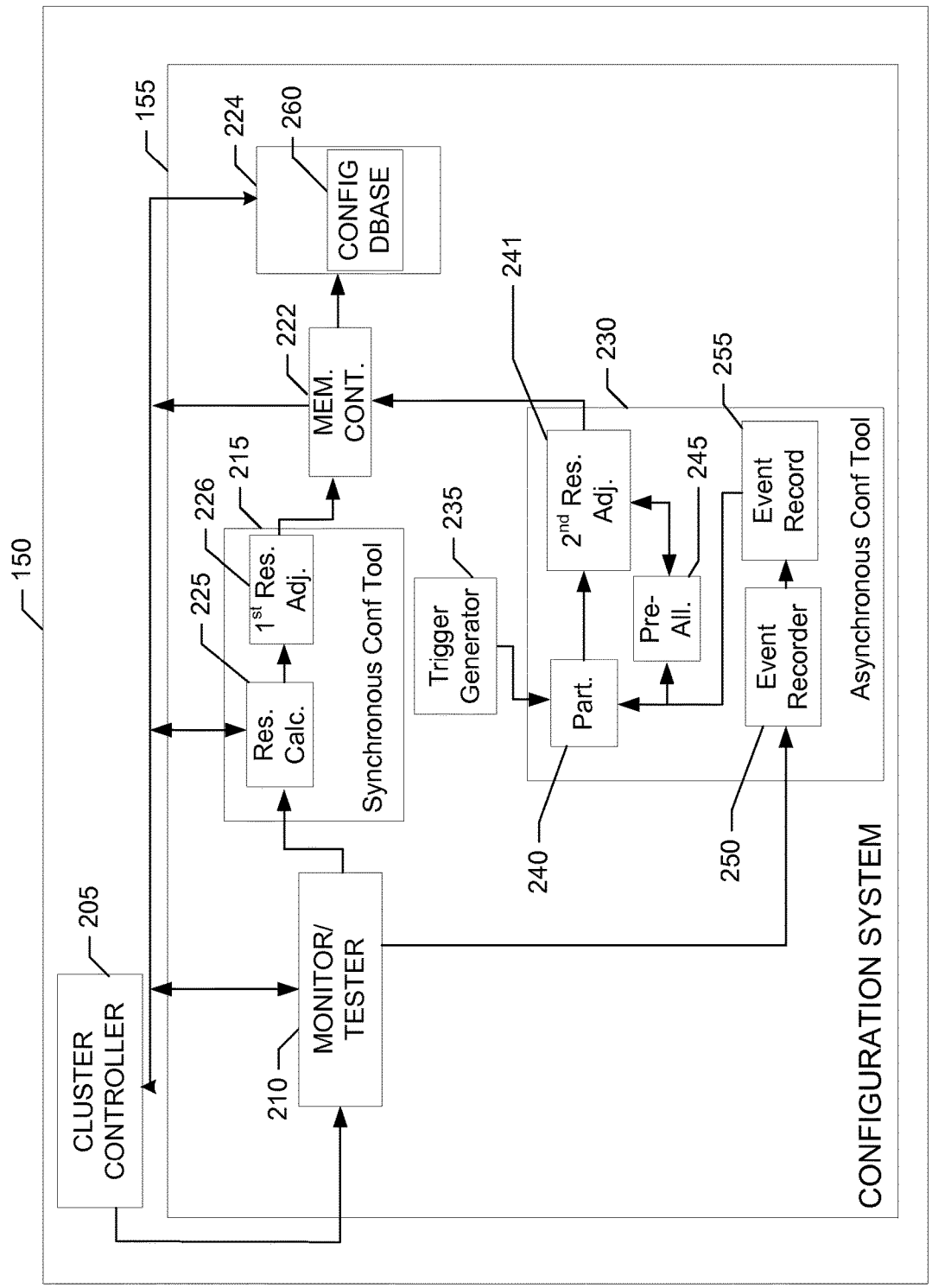
FIG. 2 is a block diagram of the example cluster configuration tool of FIG. 1.

FIG. 2 illustrates an example implementation of the example cloud system manager 150 of FIG. 1. In some examples, the cloud system manager 150 includes a cluster controller 205 and the configuration system 155 described in FIG. 1. The configuration system 155 of the illustrated example includes an example monitor/tester 210, and an example synchronous configuration tool 215 having an example resource calculator 225 and an example first resource adjuster 226. The system 155 also includes an example memory controller 222, an example storage device 224, an example asynchronous configuration tool 230 and an example trigger generator 235. In some examples, the asynchronous configuration tool 230 includes an example partitioner 240, an example second resource adjuster 241, an example pre-allocator 245 and an example event recorder 250 that records information in an event record 255.

In some examples, the cluster controller 205 responds to a deployment event by sending information regarding the event to the monitor/tester 210. The monitor/tester 210 then supplies the information to the example event recorder 250 for inclusion in the example event record 255. The information to be included in the event record 255 can identify, for example, a virtual data center and/or cluster affected by the deployment event, the number of virtual machines deployed or undeployed during the event, the cluster resource pool subject to the deployment event, etc. The monitor/tester 210 of the illustrated example also responds to the event notification signal by determining whether the cluster resource pool of the affected virtual data center contains sufficient resources to enable power-on of the newly deployed virtual machine(s). For example, a cluster resource pool having a resource limit "L" of 1 GB and one virtual machine that requires 200 MB of overhead memory cannot support the deployment of five additional virtual machines (each requiring 2 MB of overhead memory) because the amount of memory needed to enable power-on of all of the virtual machines (2 MB*6=1.2 G) exceeds the resource limit of 1 GB. Due to the lack of sufficient resources, the synchronous configuration tool adjusts the amount of resources allotted to the cluster resource pool without delay to increase the memory limit "L" from 1 GB to at least 1.2 GB and thereby enable the virtual machine(s) to power-on. In some examples, the monitor/tester 210 makes the determination as to whether the cluster resource pool has sufficient memory to enable virtual machine power-on by accessing configuration information in an example configuration database 260 stored in the storage device 224. In some examples, the configuration database 260 contains detailed information about the configuration of each virtual data center and each of the associated clusters including, for example, 1) a number of virtual machines deployed on each cluster in support of each virtual data center, 2) an amount of overhead memory needed by each virtual machine associated with a cluster, 3) an amount of reserved memory to be made available to each virtual machine, 4) the existing (pre-deployment) virtual data center resource reservation, 5) the existing cluster resource pool specification map of each cluster resource pool, etc.

If the monitor/tester 210 of the illustrated example determines that there is not sufficient memory to enable power-on of a newly deployed virtual machine(s), the resource calculator 225 determines an amount by which the memory of the affected cluster resource pool is to be increased to enable virtual machine power-on. In some examples, the example first resource adjuster 226 of the synchronous configuration tool 225 then performs a limited reconfiguration operation on the corresponding cluster by increasing/adjusting the amount of memory resources to be allotted to the cluster resource pool accordingly and informing the example memory controller 222 of the increased amount of memory resources. In some examples, the example first resource adjuster 226 adjusts the amount of memory resources to be allotted to the cluster resource pool by revising the corresponding, existing cluster resource pool specification map to incorporate the memory increase and thereby form a new cluster resource pool specification map. The memory controller 222 causes the new cluster resource pool specification map to be stored in the configuration database 260. For example, the memory controller 222 adjusts the specified minimum amount of memory "R" guaranteed to be available to the virtual data center affected by the deployment event. In some examples, the memory controller 222 stores the new cluster resource pool specification maps using conventional techniques that can include obtaining an exclusive lock on the memory location containing the existing cluster resource pool specifications and then performing the storage operation. The cluster controller 205 of the illustrated example then controls the cluster in accordance with the new cluster resource pool specification map thereby resulting in a reconfiguration of the associated cluster. In some examples, partitioning of the affected virtual data center resource reservation among the associated cluster resource pools as needed to achieve balance among the cluster resource pools is not performed in the limited reconfiguration operation but is instead performed in a unified reconfiguration operation performed by the asynchronous configuration tool 230 at a later time, as described further below. In some examples, as described above, the synchronous configuration tool 225 performs a full reconfiguration operation on the cluster affected by the deployment event to effect an increase in memory sufficient to enable virtual machine power on and to revise the cluster resource pool specification map of the corresponding cluster resource pool in accordance with a partitioning operation. The full reconfiguration operation will additionally include a reconfiguration of the other cluster(s) that supports the virtual data center affected by the deployment event as needed to effect partitioning of the virtual data center resource reservation among the associated cluster resource pools. In some such examples, a synchronous configuration tool designed to perform a full reconfiguration operation includes a partitioner in addition to a resource calculator and a first resource adjuster.

If, instead, the monitor/tester 210 of the illustrated example determines that there is sufficient memory to power-on the newly deployed virtual machine(s), the first example resource calculator 226 does not increase the amount of memory available to the cluster resource pool upon deployment and may, in some examples, notify the cluster controller 205 that the virtual machine deployment event may proceed.

As described above, the asynchronous configuration tool 230 periodically (or aperiodically) reconfigures each cluster associated with multiple virtual data centers affected by one or more deployment event(s) in response to a trigger signal supplied by the trigger generator 235. In some examples, the trigger generator 235 supplies the trigger signal when a threshold condition has been met. For example, the trigger generator 235 can supply the trigger signal on a periodic basis after a threshold amount of time has elapsed. In some such examples, the trigger generator 235 monitors the amount of time that has elapsed since the last operation of the asynchronous configuration tool 230 and determines whether the elapsed time has met or exceeded the threshold amount of time. In some examples, the trigger generator 235 supplies the trigger signal when a threshold number of events (e.g., deployment events) have occurred.

In response to the trigger signal, the partitioner 240 accesses the event record 255 to identify each virtual data center that experienced a deployment event (e.g., deployment of a new virtual machine(s)) in the time intervening between receipt of the trigger signal and receipt of a preceding trigger signal. As described above, the event recorder 250 creates the event record 255 using information supplied by the monitor/tester 210 about each virtual data center and/or cluster that has experienced a deployment event.

Irrespective of whether the asynchronous configuration tool 230 operates periodically or aperiodically, if one or more virtual data centers are identified in the event record when the threshold condition driving generation of the trigger signal is met (e.g., the threshold time has elapsed, a threshold number of deployment events have occurred, a threshold number of virtual machines have been deployed/undeployed, etc.), the partitioner 240 partitions the resource reservation of each event-affected virtual data center among the associated cluster resource pools. In some examples, the partitioning operation includes calculating an amount by which the cluster resource pool specification map of each corresponding cluster resource pool is to be adjusted. In some examples, the partitioning operation includes calculating a new cluster resource pool specification map that incorporates the amount by which the resource(s) of the corresponding cluster resource pool is to be adjusted. In some examples, the partitioner 240 also calculates an amount by which the memory resources associated with each cluster resource pool is to be increased to supply each virtual machine deployed in each cluster resource pool with a sufficient amount of reserved memory. The example partitioner 240 supplies (or otherwise makes available) the results of the partitioning operation to the example second resource adjuster 241. The second resource adjuster 241 uses the information in the event record 255 to perform a unified reconfiguration of each individual cluster by adjusting cluster resource pool specification maps of each cluster being reconfigured to reflect the corresponding amounts calculated by the example partitioner 240 and then collectively supplying the adjusted cluster resource pool specification maps to the memory controller 222 for storage in the configuration database 260. The cluster controller 205 uses the newly stored information to control each corresponding cluster accordingly.

In some examples, the second example resource adjuster 241 adjusts a cluster resource pool by replacing an existing cluster resource pool specification map with a newly calculated cluster resource pool specification map. In some examples, the second example resource adjuster 241 uses the partitioning results received from the partitioner 240 to determine whether an adjustment of a corresponding cluster resource pool specification map is needed and performs the adjustment based on that determination.

In some examples, when the synchronous configuration tool 215 performs a full reconfiguration of a cluster in response to a deployment event, the unified reconfiguration need not account for the deployment event. In such a case, the monitor/tester 210 can be configured to remove information about that deployment event from the event record so that the deployment event will not be identified among the deployment events used by the second example resource adjuster 241 to perform the unified reconfiguration at a later time.

In some examples, even if an amount of resources specified in the new cluster resource pool specification map(s) of a virtual data center exceeds an amount of memory that can be consumed by all currently-deployed virtual machines associated with the virtual data center, the pre-allocator 245 of FIG. 2 further allocates an increased level of resources to the cluster resource pools. The increased level of resources are allocated to lessen the likelihood that subsequently deployed virtual machines are unable to power-on for lack of sufficient resources. In some examples, the example pre-allocator 245 estimates a number of virtual machines to be subsequently deployed and, based on the estimate, calculates an amount by which to increase level of resources allocated to each cluster resource pool. The example pre-allocator 245 then identifies the calculated amount to the example second resource adjuster 241 for incorporation into the new cluster resource pool specification maps. In some examples, the pre-allocator 245 determines that a percentage of the reserved memory "R" available to a first cluster resource pool (e.g., the first cluster resource pool 126) is such that the remaining percentage of the reserved memory "R" available to a second cluster resource pool (e.g., the second cluster resource pool 135) is too restrictive. In such an example, the pre-allocator 245 reduces the amount of reserved memory "R" available to the first cluster resource pool 126 and increases the amount of the reserved memory "R" available to the second cluster resource pool 135 and then identifies the newly calculated amounts of memory to the example second resource adjuster 241 for incorporation into the new cluster resource pool specification maps for the first and second cluster resource pools (e.g., the first cluster resource pool 126 and the second cluster resource pool 135).

In some examples, the operations performed by the components of the synchronous and asynchronous configuration tools 215 and 230 are performed by a same configuration tool (e.g., a synchronous/asynchronous configuration tool). In some such examples, the synchronous/asynchronous configuration tool is designed to perform both the limited reconfiguration and the unified reconfiguration operations in the same manner and based on the same conditions described above with respect to the synchronous and asynchronous configuration tools 215 and 230. In some such examples, operations performed by the example first and second resource adjusters 226, 241 are performed by a same resource adjuster.

In some examples, the partitioning operation performed by the example partitioner 240 and the resource adjustments performed by the second resource adjuster 241 are both performed as part of a same unified reconfiguration operation. Likewise in some examples, the resource calculation operation performed by the resource calculator 225 and the resource adjustments performed by the example first resource adjuster 226 are part of a same limited reconfiguration operation/full reconfiguration operation.

Thus, conventional systems perform a cluster reconfiguration operation in response to each deployment event (i.e., each conventional cluster reconfiguration operation involves modifying the specifications of a single cluster resource pool on the cluster in response to a single deployment event). In contrast, the example configuration system 150 of FIGS. 1 and 2 performs a unified cluster reconfiguration operation in response to multiple deployment events (i.e., each unified cluster reconfiguration operation involves collectively modifying the cluster resource pool specification maps of multiple cluster resource pools on the cluster). As a result, the example system of FIGS. 1 and 2 performs fewer cluster reconfiguration operations, thereby increasing operating speed and efficiency.

While an example manner of implementing the example cloud system manager 150 and/or the configuration system 155 of FIGS. 1 and 2 are illustrated in FIGS. 1 and 2, one or more of the elements, processes and/or devices illustrated in FIGS. 1 and 2 may be combined, divided, re-arranged, omitted, eliminated and/or implemented in any other way. Further, the example cluster controller 205, the example configuration system 155, the example monitor/tester 210, the example synchronous configuration tool 215, the example memory controller 222, the example storage device 224, the example resource calculator 225, the example first resource adjuster 226, the example trigger generator 235, the example asynchronous configuration tool 230, the example partitioner 240, the example second resource adjuster 241, the example pre-allocator 245, the example event recorder 250, the example event record 266, and/or the example configuration database 260 and/or, more generally, the example cloud system manager 150 of FIGS. 1 and 2 may be implemented by hardware, software, firmware and/or any combination of hardware, software and/or firmware. Thus, for example, any of the example cluster controller 205, the example configuration system 155, the example monitor/tester 210, the example synchronous configuration tool 215, the example memory controller 222, the example storage device 224, the example resource calculator 225, the example first resource adjuster 226, the example trigger generator 235, the example asynchronous configuration tool 230, the example partitioner 240, the example second resource adjuster 241, the example pre-allocator 245, the example event recorder 250, the example event record 266, and/or the example configuration database 260 and/or, more generally, the example cloud system manager 150 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example cluster controller 205, the example configuration system 155, the example monitor/tester 210, the example synchronous configuration tool 215, the example memory controller 222, the example storage device 224, the example resource calculator 225, the example first resource adjuster 226, the example trigger generator 235, the example asynchronous configuration tool 230, the example partitioner 240, the example second resource adjuster 241, the example pre-allocator 245, the example event recorder 250, the example event record 266, and/or the example configuration database 260 is/are hereby expressly defined to include a tangible computer readable storage device or storage disk such as a memory, a digital versatile disk (DVD), a compact disk (CD), a Blu-ray disk, etc. storing the software and/or firmware. Further still, the example cloud system manager 150 of FIG. 1 may include one or more elements, processes and/or devices in addition to, or instead of, those illustrated in FIGS. 1 and 2, and/or may include more than one of any or all of the illustrated elements, processes and devices.

Figure 3:
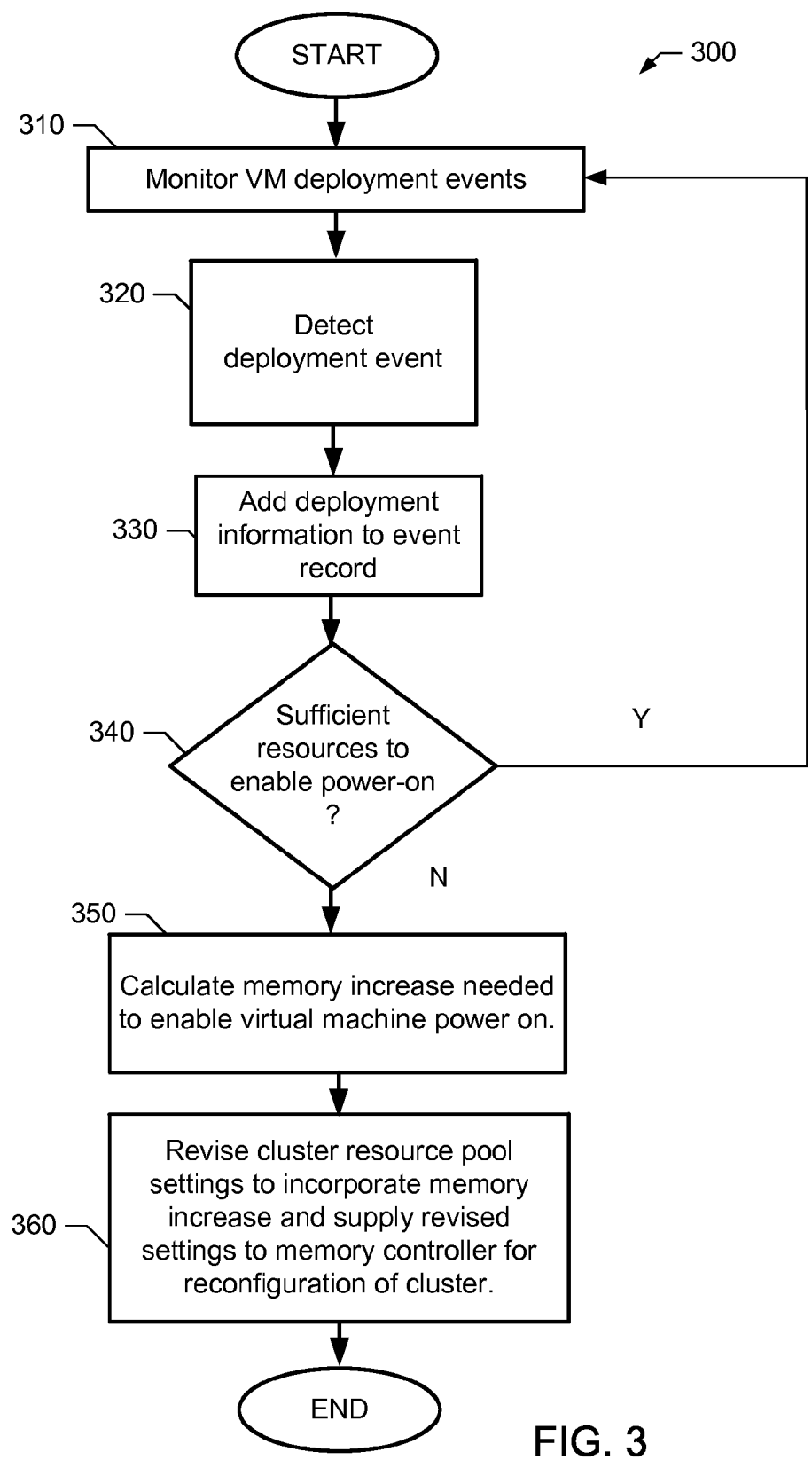
FIG. 3 is a flowchart representation of example machine readable instructions which may be executed to implement an example synchronous configuration tool of FIG. 2.
Figure 4:
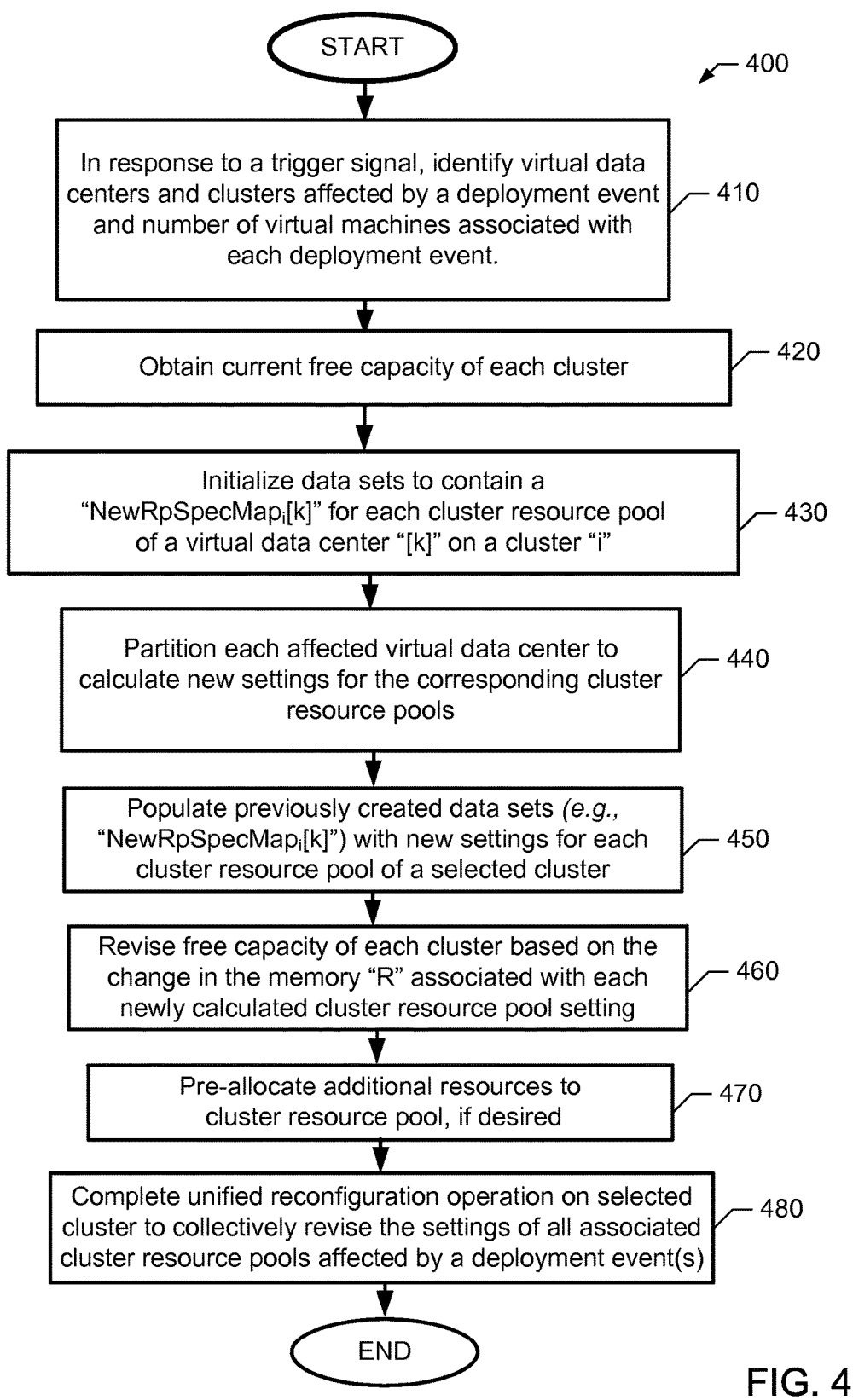
FIG. 4 is a flowchart representation of example machine readable instructions which may be executed to implement an example asynchronous configuration tool of FIG. 2.

Flowcharts representative of example machine readable instructions for implementing the cloud system manager 150 of FIGS. 1 and 2 are shown in FIGS. 3, 4, and 5. In these examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and 5, many other methods of implementing the cloud system manager 150 may alternatively be used. For example, the order of execution of the blocks may be changed, and/or some of the blocks described may be changed, eliminated, or combined.

As mentioned above, the example processes of FIGS. 3, 4, 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3, 4, and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Example machine readable instructions that may be executed to implement the cloud system manager 150 and/or the configuration system 155 of FIGS. 1 and 2 are represented by the flowcharts 300 and 400 illustrated in FIGS. 3 and 4 and by the pseudo code 500 shown in FIG. 5. The example machine readable instructions 300, 400 of FIGS. 3 and 4 and the pseudo code 500 of FIG. 5 may be executed at intervals (e.g., predetermined intervals), based on an occurrence of an event (e.g., a predetermined event), etc., and/or any combination thereof. The example machine readable instructions represented by the flowchart 300 begin by causing the example monitor/tester 210 of FIG. 2 to monitor an output supplied by the cluster controller 205 for a signal indicating that a deployment event has occurred. (See block 310). When a deployment event is detected (see block 320), the example monitor/tester 210 of FIG. 2 supplies information about the deployment event to the event recorder 250 for inclusion in the event record 255 of FIG. 2. (See block 330). Then the example monitor/tester 210 of FIG. 2 determines whether there are sufficient cluster resources to enable power-on of the newly deployed virtual machines(s) associated with the deployment event. (See block 340). If sufficient resources are available, the example monitor/tester 210 of FIG. 2 returns to monitoring for additional deployment event(s). If there are insufficient resources (see block 340), then the monitor/tester 210 supplies information about the deployment event to the example first resource calculator 225 of the synchronous configuration tool 215 which uses conventional techniques to determine an amount by which to increase the memory available to the cluster resource pool subject to the deployment. (See block 350). The example first resource calculator 225 supplies the determined amount by which to increase the memory resources to the example first resource adjuster 226. The example first resource adjuster 226 performs a limited reconfiguration operation of the associated cluster by revising/adjusting the corresponding cluster resource pool specification map to reflect the increased amount of resources determined by the resource calculator 225 and then supplying the revised cluster resource pool specification map to the example memory controller 222 for storage in the example configuration database 260. (See block 360). Thereafter, the cluster controller 205 manages the cluster in accordance with the revised cluster resource pool specification map. As described above, in some examples, the example synchronous configuration tool 215 performs a full reconfiguration of the clusters associated with the virtual data center subject to the deployment event. When a full reconfiguration event is performed, the monitor/tester 210 is designed to remove information concerning the deployment event from the event record to prevent the deployment event from being used to perform a unified reconfiguration of the cluster at a later time. In some examples, the monitor/tester 210 can instead place information in the event record 255 indicating that the deployment event is not to be included in calculations performed by the asynchronous configuration tool 230 at a later time.

Example machine readable instructions that may be executed by the cloud system manager 150 and/or the configuration system 155 of FIGS. 1 and 2 to asynchronously reconfigure a cluster are illustrated in the flowchart 400 of FIG. 4. The example machine readable instructions begin when the example partitioner 240 of FIG. 2 receives a trigger signal from the example trigger generator 235 of FIG. 2. In response, the example partitioner 240 of FIG. 2 obtains a list of deployment events occurring in the time intervening between receipt of the trigger signal and receipt of an earlier-generated trigger signal. (See block 410). In some examples, the list of deployment events includes information identifying the virtual data centers and corresponding cluster resource pools affected by a deployment event, the number of virtual machines associated with each deployment event, etc. In some examples, the example partitioner 240 obtains the deployment event list from the from the event record 255 of FIG. 2 and/or from the configuration database 260 (See block 410). The example partitioner 240 organizes the retrieved list to group the deployment events by, for example, the virtual data center, and/or the corresponding clusters, and/or the corresponding cluster resource pools affected by each deployment event. The example partitioner 240 also uses the list obtained from the event record 255 to determine a net number of virtual machines deployed on each individual, affected virtual data center during the intervening time. For example, the net number of virtual machines deployed on a virtual data center in the intervening time is equal to the number of virtual machines undeployed during the intervening time subtracted from the number of virtual machines deployed during the intervening time. The net number of virtual machines deployed on each virtual data center is then added to the number of virtual machines associated with each virtual data center prior to the receipt of earlier-generated trigger signal to thereby determine the total number of virtual machines associated with each virtual data center after the intervening time has elapsed (e.g., after receipt of the trigger signal).

The example partitioner 240 also determines a net number of virtual machines deployed on each cluster resource pool associated with a deployment-event affected virtual data center during the intervening time. For example, the net number of virtual machines deployed on each cluster resource pool in the intervening time is equal to the number of virtual machines undeployed during the intervening time subtracted from the number of virtual machines deployed during the intervening time. The net number of virtual machines deployed on each corresponding cluster resource pool is then added to the number of virtual machines associated with each cluster resource pool prior to receipt of the earlier-generated trigger signal to thereby determine the total number of virtual machines deployed on each cluster resource pool after the intervening time has elapsed.

The example partitioner 240 also obtains the current unreserved (free) capacity of each cluster included in the list for adjustment at a later time, as needed. (See block 420). In some examples, the partitioner 240 initializes empty data sets that will later be populated with a set of newly calculated cluster resource pool specification maps "(NewRpSpecMap$_i$[k])," each corresponding to a cluster resource pool of one of the virtual data centers "k" associated with a cluster, "i." (See block 430).

In some examples, the example partitioner 240 of FIG. 2 calculates a new apportionment for the resource reservation of each affected virtual data center to yield a new set of cluster resource pool specifications "$\{R^i_{new}, L^i_{new}, S^i_{new}\}$" for each cluster resource pool associated with the virtual data center (see block 440), where "$R^i_{new}$" represents the newly calculated minimum amount of guaranteed resources reserved for the cluster resource pool on a cluster "i," "$L^i_{new}$" represents the newly calculated maximum limit on resources reserved for the cluster resource pool, and "$S^i_{new}$" represents the importance level (e.g., high, medium, low) assigned to the set of virtual machines in the cluster resource pool. In the event that different sets of virtual machines on a same cluster vie for the same memory resources, the assigned importance level will determine which set of virtual machines will receive the needed memory resources. The importance level associated with a set of virtual machines in a cluster resource pool is typically specified by the cloud tenant according to the nature of the workload (e.g. cluster resource pools supporting highly critical applications will be assigned higher importance than cluster resource pools supporting less critical applications). In some examples, when the cloud tenant has not assigned importance levels, the importance levels are automatically assigned by cloud application management software As described above, in some examples, the resources are partitioned among the cluster resource pools associated with a virtual data center in proportion to the number of virtual machines deployed on each cluster resource pool. In some examples, the partitioning is calculated using any other desired technique. In instances in which the net number of virtual machines has changed on a virtual data center but the proportion of virtual machines on each cluster remains the same, partitioning of the associated clusters may not be needed. The example partitioner 240 makes the newly calculated cluster resource pool specifications available to the second example resource adjuster 241 of FIG. 2.

In some examples, the second example resource adjuster 241 selects a cluster, "i," to be reconfigured and begins a unified reconfiguration operation on the selected cluster "i" by adjusting the resources to be apportioned/allotted to each cluster resource pool of the selected cluster "i." (See block 450). In some examples, the resources allotted to each cluster resource pool are adjusted by storing the corresponding newly calculated cluster resource pool specification map "$\{R^i_{new}, L^i_{new}, S^i_{new}\}$" in the data sets created to contain the new cluster resource pool specification maps (i.e., "(NewRpSpecMap$_i$[k]),"). (See block 450).

The unified reconfiguration operation performed by the example second resource adjuster 241 can also include calculating and adjusting the unreserved (free) capacity ("Cap$_i$") of the selected cluster "i" to reflect the change in the amount of guaranteed resources resulting from the re-apportionment, (i.e., the current amount of resources guaranteed to be available "$R^i_{current}$" prior to the deployment events minus the newly calculated amount of resources guaranteed to be available, "$R^i_{new}$"). (See block 460).

In some examples, the example pre-allocator 245 of FIG. 2 allocates an increased level of resources to the relevant cluster level resource pools using, for example, a step function to lessen the likelihood that repartitioning/reapportionment is required upon subsequent deployment of additional virtual machines. (See block 470). In some examples, the example pre-allocator increases the level of resources apportioned to a cluster resource pool even though an amount of memory included in the corresponding virtual data center reservation exceeds the amount of memory that can be consumed by all currently-deployed virtual machines associated with the virtual data center. The example pre-allocator 245 can allocate the increased level of resources by identifying the increase level of resources to the second example resource adjuster 241. The second example resource adjuster 241 can then use the increased level of resources identified by the example pre-allocator 245 to further adjust the corresponding cluster resource pool specifications map (e.g., "NewRpSpecMap$_i$[k]") during the unified reconfiguration operation.

In the illustrated example of FIG. 4, the example cluster resource adjuster 241 of FIG. 2 completes the unified reconfiguration of the selected cluster by collectively supplying the adjusted cluster resource pool specification maps of the selected cluster (e.g., "NewRpSpecMaps$_i$[k]") to the memory controller 222. The memory controller 222 causes the "NewRpSpecMaps$_i$[k]" to be stored in the configuration database 260 for use by the cluster controller in controlling the reconfigured cluster. (See block 480). The unified reconfiguration operation (see blocks 450-480) is repeated for each cluster having one or more cluster resource pools affected by a deployment event(s).

Thus, the example asynchronous configuration tool 230 of FIGS. 1 and 2 operates to: 1) record all deployment events occurring over a period of time intervening between two trigger signals, 2) use the recorded information to identify deployment events occurring during the intervening period of time, 3) based on the net change in the number of virtual machines, partition the resource reservation of each virtual data center among the cluster resource pools associated with each virtual data center, 4) based on the partition, calculate a new cluster resource pool specification map for each cluster resource pool, and 5) perform a unified reconfiguration operation on each individual cluster by adjusting the cluster resource pools associated with each such cluster and collectively supplying the adjusted cluster resource pools to the memory controller 222 for storage in the example configuration database 260. By performing the unified reconfiguration operation to reconfigure a cluster in response to multiple deployment events affecting multiple cluster resource pools of the cluster, the total number of times each cluster is reconfigured by the could system manager 150 of FIGS. 1 and 2 is greatly reduced compared to conventional configuration systems thereby improving operating speed and efficiency.

An example set of machine readable instructions that may be executed by the cloud system manager 150 and/or the configuration system 155 of FIGS. 1 and 2 to implement the flowchart 400 of FIG. 4 are illustrated using the pseudo code 500 of FIG. 5. The example machine readable instructions cause the asynchronous configuration tool 215 to operate in response to a trigger signal generated by the example trigger signal generator 235 of FIG. 2. Based on the trigger signal, the example partitioner 240 of FIG. 2 obtains a list of deployment events occurring between receipt of the trigger signal and receipt of an earlier-generated trigger signal. In some examples, the list identifies, for each deployment event, information identifying the virtual data center affected by the deployment event, information identifying the clusters associated with the identified virtual data center, the cluster resource pool specifications of each cluster resource pool associated with each identified cluster, etc. (See lines 504-508).

In some examples, the partitioner 240 shuffles (or orders) the list of deployment events (see line 510) by, for example, grouping the deployment events associated with a common cluster and/or a common virtual data center together. For each cluster to be reconfigured, the retrieves from the example configuration database 260 a corresponding current (pre-deployment events) unreserved (free) cluster capacity (e.g., "Cap$_i$"). (See lines 512-514). The example partitioner 240 initializes empty data sets for each cluster, referred to as, for example, "NewRpSpecMap$_i$," that are configured to be populated at a later time with new cluster resource pool specification maps calculated for each corresponding cluster resource pool. The example machine readable instructions further cause the example partitioner 240 to partition each resource reservation of each virtual data center to yield a new set of corresponding cluster resource pool specifications "$\{R^i_{new}, L^i_{new}, S^i_{new}\}$." (See lines 518-522). The example partitioner 240 of FIG. 2 partitions the resource reservation associated with each virtual data center among an associated set of cluster resource pools according to any desired technique including by apportioning the resources based on the number of virtual machines deployed on each cluster resource pool after receipt of the trigger signal.

The example machine readable instructions also cause the example second resource adjuster 241 to use a unified reconfiguration operation to reconfigure each cluster. In some examples, the example second resource adjuster 241 of FIG. 2 begins the unified reconfiguration of each cluster by storing the corresponding, newly calculated cluster resource pool specifications "$\{R^i_{new}, L^i_{new}, S^i_{new}\}$" associated with each cluster into the data sets created to contain the corresponding new cluster resource pool specification maps "(NewRpSpecMap$_i$[k])." (See line 526). As described above, each "NewRpSpecMap$_i$[k]" corresponds to one of the cluster resource pools associated with a virtual data center "k" and supported on the cluster "i." In addition, the example partitioner 240 of FIG. 2 adjusts the unreserved (free) capacity "Cap$_i$" of each cluster to reflect the change in the amount of guaranteed resources resulting from the partitioning operation, (i.e., the current amount of resources guaranteed to be available $R^i_{current}$ minus the newly calculated amount of resources guaranteed to be available, $R^i_{new}$). (See line 528).

The example machine readable instructions cause the second example resource adjuster 241 to complete the unified reconfiguration operation of each cluster by collectively supplying the corresponding adjusted cluster resource pool specification maps (e.g., "NewRpSpecMaps$_i$") and the corresponding new unreserved capacity to the example memory controller 222 of FIG. 2. (See line 530). As described above in connection with FIG. 4, the example memory controller 222 causes the information supplied by the second example resource adjuster 241 to be stored in the example configuration database 260 during a same storage operation thereby resetting multiple cluster resource pools on the cluster being reconfigured at a same time.

Figure 6:
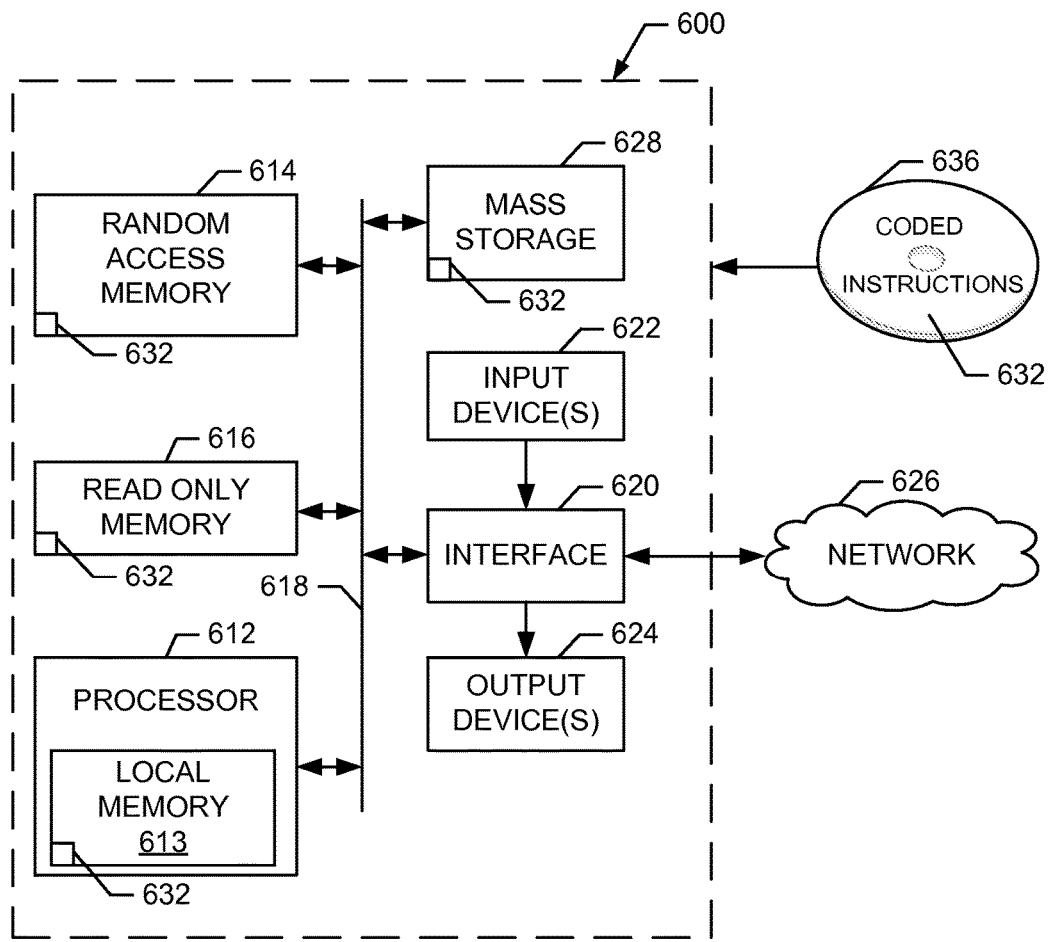
FIG. 6 is a block diagram of an example processing system that may execute the example machine readable instructions of FIGS. 3, 4 and/or 5 and to implement the example configuration system and/or the cloud system manager of FIG. 1.

FIG. 6 is a block diagram of an example processor platform 600 capable of executing the instructions of FIGS. 3, 4 and 5 to implement the apparatus of FIGS. 1 and 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3, 4 and 5 may be stored in the mass storage device 628, in the volatile memory 614, in the non-volatile memory 616, and/or on a removable tangible computer readable storage medium such as a CD or DVD.

As an alternative to implementing the methods and/or apparatus described herein in a system such as the processing system of FIG. 6, the methods and/or apparatus described herein may be embedded in a structure such as a processor and/or an ASIC (application specific integrated circuit).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A method comprising:
   detecting that a threshold condition has been satisfied, the threshold condition being one of 1) occurrence of a threshold number of deployment events greater than one, the deployment events affecting at least one of a first virtual data center, and a second virtual data center, and 2) passage of a threshold amount of time;
   in response to detecting that the threshold condition has been satisfied:
   determining, by executing an instruction with a processor, a first partitioning of a first resource reservation of the first virtual data center between a first cluster resource pool of a first cluster and a second cluster resource pool of a second cluster to accommodate a first set of the deployment events affecting the first virtual data center, the first virtual data center being associated with a first tenant;
   determining, by executing an instruction with a processor, a second partitioning of a second resource reservation of the second virtual data center between a third cluster resource pool of the first cluster and a fourth cluster resource pool of the second cluster to accommodate a second set of the deployment events affecting the second virtual data center, the second virtual data center being associated with a second tenant; and
   based on the determining of the first partitioning and the second partitioning, performing a single cluster reconfiguration operation, by executing an instruction with the processor, to adjust, in a configuration database, a first amount of resources allotted to the first cluster resource pool of the first cluster and a second amount of resources allotted to the third cluster resource pool of the first cluster.

2. A method as defined in claim 1, the method further including:

upon detecting a first deployment event of the first set of deployment events occurring at the first cluster, determining whether the first cluster includes sufficient memory resources to enable power-on of a virtual machine deployed on the first cluster; and when the memory resources of the first cluster are determined to be insufficient, without waiting for the threshold condition to be detected, increasing the memory resources allotted to the first cluster by an amount at least sufficient to enable power-on of the virtual machine.

3. A method as defined in claim 1, wherein the determining of the first partitioning of the first resource reservation is based on a net change in a number of virtual machines associated with the first set of deployment events.

4. A method as defined in claim 1, wherein the cluster reconfiguration operation is to include estimating a number of virtual machines to be deployed in the first virtual data center on the first cluster subsequent to the cluster reconfiguration operation, the cluster reconfiguration operation further adjusting the first amount of resources allotted to the first cluster resource pool by an amount sufficient to enable power-on of the estimated number of virtual machines.

5. A configuration system comprising:

at least one processor to execute instructions to implement:

a deployment event monitor to determine when a threshold condition has been satisfied, the threshold condition being one of 1) an occurrence of a threshold number of deployment events greater than one, the deployment events affecting at least one of a first virtual data center and a second virtual data center, and 2) a passage of a threshold amount of time a trigger signal generator to generate a trigger signal when the threshold condition is determined to be satisfied;

a partitioner to, in response to the trigger signal, determine a first partitioning of a first resource reservation of the first virtual data center between a first pool of resources supported by a first cluster of servers and a second pool of resources supported by a second cluster of servers to accommodate a first set of the deployment events, the first set of the deployment events affecting the first virtual data center, and to determine a second partitioning of a second resource reservation of a second virtual data center between a third pool of resources supported by the first cluster of servers and a fourth pool of resources supported by the second cluster of servers to accommodate a second set of the deployment events, the second set of the deployment events affecting the second virtual data center, and the first virtual data center being associated with a first tenant and the second virtual data center being associated with a second tenant; and a resource adjuster to adjust, based on the first partitioning of the first resource reservation and the second partitioning of the second resource reservation, a first amount of resources included in the first pool of resources and a second amount of resources included in the third pool of resources in a same cluster reconfiguration operation.

6. A configuration system as defined in claim 5, wherein the resource adjuster is a first resource adjuster, the system further including:

a detector to detect a first deployment event of the first set of deployment events affecting the first virtual data center, and to determine whether an affected one of the first cluster and the second cluster includes sufficient memory resources to enable power-on of a virtual machine deployed on the affected one of the first cluster and the second cluster in the first deployment event; and a second resource adjuster to, based on the determination and without waiting for the trigger signal to be generated, increase memory resources allotted to the affected one of the first cluster and the second cluster by an amount sufficient to enable power-on of the virtual machine.

7. A configuration system as defined in claim 6, wherein the first resource adjuster and the second resource adjuster are a same resource adjuster.

8. A configuration system as defined in claim 5, wherein and the partitioner is to determine the first partitioning of partition the first resource reservation based on a net change in a number of virtual machines associated with the first set of deployment events.

9. A non-transitory tangible machine readable storage medium comprising instructions that, when executed, cause a machine to at least:

determine when a threshold condition has been satisfied, the threshold condition being one of 1) an occurrence of a threshold number of deployment events greater than one, the threshold deployment events affecting a plurality of virtual data centers supported by at least a first cluster and a second cluster, and 2) a passage of a threshold amount of time;

in response to determining the threshold condition has been satisfied and to accommodate respective deployment events affecting respective ones of the plurality of virtual data centers, determine respective partitionings of respective resource reservations associated with respective ones of the plurality of virtual data centers between the at least the first cluster and the second cluster to determine a respective portion of each respective resource reservation to be allotted to the first cluster, the respective portion of each respective resource reservation allotted to the first cluster being associated with a respective cluster resource pool; and based on the respective portions, execute one cluster reconfiguration operation to collectively adjust respective resources assigned to the respective cluster resource pools of the first cluster, each respective cluster resource pool of the first cluster being associated with a different tenant.

10. A non-transitory tangible machine readable storage medium as defined in claim 9, wherein the instructions further cause the machine to:

in response to detecting a first of the respective deployment events occurring at the first cluster, determine whether a first of the cluster resource pools affected by the first of the respective deployment events has sufficient memory resources to enable power-on of a virtual machine deployed in the first of the respective deployment events; and when the resources of the first cluster resource pool are insufficient, without waiting for the threshold condition to be satisfied, increase the memory resources assigned to the first cluster resource pool by an amount at least sufficient to enable power-on of the virtual machine.

11. A non-transitory tangible machine readable storage medium as defined in claim 10, wherein a first respective portion of a first respective resource reservation is determined based on a net change in a number of virtual machines deployed in a first respective one of the plurality of virtual data centers.

12. A non-transitory tangible machine readable storage medium as defined in claim 9, wherein the instructions further cause the machine to:

determine whether a respective one of the cluster resource pools affected by a respective one of the deployment events has insufficient memory resources to support power-on of a virtual machine associated with the respective one of the deployment events; and, if the respective one of the cluster resource pools has insufficient memory to support power-on of the virtual machine, increase the memory resources of the respective one of the cluster resource pools by an amount sufficient to permit power-on of the virtual machine, the cluster reconfiguration being performed independently of the increase in memory resources performed to enable virtual machine power-on and the increase in memory resources performed to enable virtual machine power-on being performed before the threshold condition has been satisfied.

* * * * *